United States Patent [19]
Leblans et al.

[11] Patent Number: 5,358,668
[45] Date of Patent: Oct. 25, 1994

[54] PHOTOSTIMULABLE PHOSPHOR AND ITS USE IN RADIOGRAPHY

[75] Inventors: Paul Leblans, Berchem; Paul Lardon, Wijnegem, both of Belgium

[73] Assignee: AGFA-Gevaert, N.V., Mortsel, Belgium

[21] Appl. No.: 899,852

[22] Filed: Jun. 17, 1992

[30] Foreign Application Priority Data

Jul. 8, 1991 [EP] European Pat. Off. ......... 91201762.1

[51] Int. Cl.$^5$ .................. G02B 5/20; C09K 11/08
[52] U.S. Cl. ................. 252/584; 252/301.4 F; 252/301.4 H
[58] Field of Search .......... 252/584, 301.4 F, 301.4 H

[56] References Cited

U.S. PATENT DOCUMENTS

| | | |
|---|---|---|
| 4,220,551 | 9/1980 | Fouassier et al. ............ 252/301.4 F |
| 5,099,490 | 3/1992 | Atherton et al. . |
| 5,124,564 | 6/1992 | Fouassier et al. ............ 252/301.4 F |
| 5,140,159 | 8/1992 | Blasse et al. ................ 252/301.4 H |
| 5,140,163 | 8/1992 | Tecotzky et al. ............ 252/301.4 F |

*Primary Examiner*—Philip Tucker
*Attorney, Agent, or Firm*—Breiner & Breiner

[57] ABSTRACT

A photostimulable X-ray energy absorbing halosilicate phosphor, characterized in that said phosphor contains as host metal at least one alkaline earth metal, as halogen at least one member selected from the group consisting of Cl, Br and I, as dopant $Eu^{2+}$ and lithium as co-dopant.

6 Claims, 4 Drawing Sheets

PHOTOSTIMULABLE PHOSPHOR AND ITS USE IN RADIOGRAPHY

FIELD OF THE INVENTION

This invention relates to a photostimulable phosphor and to a method of recording and reproducing an X-ray pattern by means of said phosphor.

BACKGROUND OF THE INVENTION

It is well known that X-rays can cause appropriate substances to luminesce. Substances showing the phenomenon of luminescence under the influence of X-rays are called phosphors.

According to a classical radiographic method photographic silver halide emulsion film is combined with a sheetlike element, called intensifying screen that contains a particulate phosphor distributed in a binder layer to convert X-rays into fluorescent light whereto the film is much more sensitive than to the direct exposure with X-rays.

The phosphors used in said screens should have on X-ray exposure a high prompt emission but not exhibit appreciable long lived emission after the X-ray exposure is switched off.

According to another method of recording and reproducing an X-ray pattern disclosed e.g. in U.S, Pat. No. 3,859,527 and 4,258,264 a special type of phosphor is used, known as a photostimulable phosphor, which being incorporated in a panel is exposed to incident pattern-wise modulated X-rays and as a result thereof temporarily stores therein energy stemming from the X-ray radiation pattern. At some interval after the X-ray exposure, a beam of visible or infra-red light scans the panel to stimulate the release of stored energy as light that is detected and converted to sequential electrical signals which are processable to produce a visible image. For this purpose, a stimulable phosphor should store as much as possible of the incident X-ray energy and release as slowly as possible the stored energy until stimulated by the scanning beam. In other words the phosphor should have a high energy storage capacity with slow dark decay. In addition thereto the release of the stored energy on photo-stimulation should proceed efficiently, i.e. almost all the stored energy should be released within reasonable readout times in the form of stimulation light having a wavelength range sufficiently apart from the wavelength range of the stimulating light. In practice the stimulable phosphor should have high sensitivity to stimulating light in the wavelength range of 500 to 700 nm wherein a He—Ne laser (633 nm), ruby laser (694 nm), frequency doubled neodymium YAG laser (532 nm) or argon ion laser (514.5 nm) are emitting. From these commercial lasers the argon ion laser is the most powerful and offers in seqential exposure (scanning) the possibility to shorten the readout time.

The light emitted by stimulating the phosphor, called stimulation light, is situated preferably in the wavelength range of 300 to 500 nm where photomultiplier tubes have high quantum efficiency (ref. the periodical Radiology, September 1983, p. 834) and the stimulation light can be separated efficiently from the stimulating light by means of a proper cut-off filter.

As described in the above mentioned periodical the imaging plate containing a stimulable phosphor can be used repeatedly to store X-ray images simply by flooding it with light to erase the residual energy it contains.

Another important property for a practically useful phosphor is its chemical stability, more particularly its resistance to moisture, since hygroscopic phosphors suffer from loss in luminescence power when becoming wet.

As can be learned from U.S. Pat. No. 4,587,036 some europium-doped alkaline earth fluorohalides (described in EP No. 0 021 342) are sensitive to moisture whereby their fluorescence power is reduced.

In published European patent application No. 0 304 121 $Eu^{2+}$ and/or $Ce^{3+}$ doped (activated) halosilicates are described which are particularly resistant to moisture and have a high conversion efficiency of stored X-ray energy into visible stimulation light on stimulation with argon ion laser light of 514.5 nm.

In U.S. Pat. No. 5,034,607 $Eu^{2+}$ or $Ce^{3+}$ doped (activated) halogermanates and halo(silicate-germanate) phosphors optionally co-doped with $Na^+$, $K^+$ or $Li^+$ are described which are particularly resistant to moisture and have a high conversion efficiency of stored X-ray energy into visible stimulation light on stimulation with light of wavelength range beyond 600 nm, so for He—Ne laser light of 633 nm.

As is generally known most phosphors contain in their empirical formula structure one or more host metals and a dopant or activator metal in admixture with one or more co-dopants. The host metal gives the phosphor X-ray stopping power and in conjunction with the dopant and co-dopants determines its energy storage capacity. The fluorescent light emission spectrum and the efficiency of the transformation of absorbed X-ray energy into emitted fluorescent light on stimulation are determined mainly by the dopant and the optionally present co-dopants.

SUMMARY OF THE INVENTION

It is an object of the present invention to provide new halosilicate compounds that are particularly useful as photostimulable phosphors in a process for recording and reproducing an X-ray image by stimulated emission of stored X-ray energy.

It is more particularly an object of the present invention to provide new halosilicate compounds that are non-hygroscopic and show a very slow dark decay of the absorbed X-ray energy which can be released efficiently by stimulating light in the wavelength range of 480 to 700 nm, so with He—Ne laser light (633 nm), argon ion laser light emitted at 514.5 nm and/or stimulating light of frequency doubled (532 nm) Nd:YAG laser light.

It is another object of the present invention to provide an X-ray screen or panel containing said new phosphor dispersed in a binder layer.

It is a further object of the present invention to provide a process for recording and reproducing a pattern of X-ray radiation wherein said new phosphor is used for storing energy contained in X-ray radiation and said energy is freed again by photostimulation in the form of fluorescent light that is detected.

Other objects and advantages of the present invention will become clear from the following description.

DETAILED DESCRIPTION OF THE INVENTION

In accordance with the present invention a photostimulable X-ray energy absorbing halosilicate phosphor is provided, characterized in that said phosphor contains as host metal at least one alkaline earth metal, as halogen at least one member selected from the group consisting of Cl, Br and I, as dopant $Eu^{2+}$ and as co-dopant lithium.

The term "silicate" applies to chemical compounds including anions consisting of silicon and oxygen.

Particularly useful phosphors according to the present invention contain as host metal at least one alkaline earth metal selected from the group consisting of Ba, Sr and Ca.

Preferred phosphors according to the present invention are within the scope of the following empirical formula:

wherein:
Z is at least one co-host metal selected from the group consisting of strontium and calcium,
q is in the range of 0 to 0.5,
X is bromine and/or chlorine,
n is in the range of 0.0001 to 0.15,
p is in the range of 0 to 0.015,
D is at least one co-dopant selected from the group consisting of $Na^+$, $K^+$ and a rare earth metal ion other than $Eu^{2+}$ and $Ce^{3+}$, e.g. $Y^{3+}$,
m is 1 or 3, and
z is in the range of $2 \times 10^{-5}$ to $2 \times 10^{-1}$.

Other phosphors according to the present invention are within the scope of the following empirical formula:

wherein:
Z is at least one co-host metal selected from the group consisting of barium and calcium,
q is in the range of 0 to 0.5,
X is bromine and/or chlorine, but preferably bromine,
n is in the range of 0.0001 to 0.15,
p is in the range of 0 to 0.015,
D is at least one co-dopant selected from the group consisting of $Na^+$, $K^+$ and a rare earth metal ion other than $Eu^{2+}$ and $Ce^{3+}$, e.g. $Y^{3+}$,
m is 1 or 3, and
z is in the range of $2 \times 10^{-5}$ to $2 \times 10^{-1}$.

Phosphors according to the present invention that are particularly useful in X-ray image reproduction by photostimulation are within the scope of one of the empirical formulae (I) or (II):

(I)

(II)

wherein:
X is bromine and/or chlorine,
n is in the range of 0.0001 to 0.15,
p is in the range of 0 to 0.015,
D is at least one co-dopant selected from the group consisting of $Na^+$,
$K^+$ and a rare earth metal ion other than $Eu^{2+}$ and $Ce^{3+}$, e.g. $Y^{3+}$,
m is 1 or 3, and
z is in the range of $2 \times 10^{-5}$ to $2 \times 10^{-1}$.

Particularly preferred photostimulable phosphors according to the present invention are within the scope of one of the empirical formulae (III) or (IV):

(III)

(IV)

wherein n is in the range from 0.0001 to 0.15,
X is bromine and/or chlorine,
M is lithium, and
z is in the range of $2 \times 10^{-5}$ to $2 \times 10^{-1}$.

Photostimulable phosphors according to the present invention can be prepared by firing at least once $Eu_2O_3$ or $EuF_3$ in admixture with (a) host metal halide compound(s), and (a) host metal compound(s) that can be pyrolized into oxide, e.g. carbonates, in admixture with $SiO_2$ (silica) for periods of up to 40 hours at temperatures between 450° and 1100° C. $Eu_2O_3$ can be used in admixture with halides and/or oxides of other co-dopants, e.g. $Y_2O_3$ and/or $YF_3$ in the firing stage. A lithium compound such as LiOH, $Li_2CO_3$, LiF, LiCl, LiBr or LiI is added in such a way that at least part of it is present after the first firing of the raw mix of the above mentioned other phosphor ingredients.

The raw mix is subjected to a first firing in $N_2$-atmosphere at a temperature between 450° and 1000° C. Following the first firing the lithium compound is mixed with the fired and crushed product and firing is repeated, preferably in multiple stages, in reducing atmosphere at a temperature of between 500° and 1000° C.

In accordance with the present invention a method for recording and reproducing an X-ray image is provided which method comprises the steps of:
(1) image-wise exposing a photostimulable phosphor to X-rays,
(2) photostimulating said phosphor with stimulating electromagnetic radiation selected from visible light and infrared light to release from said phosphor in accordance with the absorbed X-rays electromagnetic radiation different in wavelength characteristic from the radiation used in the photostimulation, and
(3) detecting the light emitted by the photostimulation applied in step (2), characterized in that said phosphor is a lithium-doped halosilicate phosphor as defined above.

The photostimulation proceeds preferably with visible light, e.g. laser light, in the wavelength range of 480 to 700 nm. Preferably photostimulation is carried out with a scanning laser beam of a He—Ne laser emitting at 633 nm, an argon ion laser emitting at 514.5 nm or the laser light of 532 nm of frequency doubled Nd:YAG laser.

In a practical embodiment before detecting the light emitted by photostimulation the stimulating light is filtered out by one or more optical filters having a high transmission for the light emitted on photostimulation.

The light emitted by photostimulation is detected preferably with a transducer transforming light energy into electrical energy, e.g. a phototube (photomultiplier) providing sequential electrical signals that can be digitized and stored. After storage these signals can be subjected to digital processing. Digital processing includes e.g. image contrast enhancement, spatial frequency enhancement, image subtraction, image addition and contour definition of particular image parts.

According to one embodiment for the reproduction of the recorded X-ray image the optionally processed digital signals are transformed into analog signals that are used to modulate a writing laser beam, e.g. by means of an acousto-optical modulator. The modulated laser beam is then used to scan a photographic material, e.g. silver halide emulsion film whereon the X-ray image optionally in image-processed state is reproduced. For said embodiment and apparatus used therein reference is made e.g. to the periodical Radiology, September 1983, p. 833–838.

According to another embodiment the digital signals obtained from the analog-digital conversion of the electrical signals corresponding with the light obtained through photostimulation are displayed on a cathode-ray tube. Before display the signals may be processed by computer. Conventional image processing techniques can be applied to improve the signal-to-noise ratio of the image and enhance the image quality of coarse or fine image features of the radiograph.

For use in said method according to the present invention the photostimulable phosphor is applied preferably in dispersed state in a binder layer that may be supported or self-supporting and forms a screen or panel, called an X-ray image storage panel.

Suitable binders for forming a binder layer incorporating said phosphor in dispersed form are film forming organic polymers, e.g. a cellulose acetate butyrate, polyalkyl (meth)acrylates, e.g. poly(methyl methacrylate), a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl chloride/vinyl acetate/vinyl alcohol) or mixture thereof.

It is preferable that a minimum amount of binder be employed to obtain a high X-ray energy absorption. However, a very small amount of binding agent may result in a too brittle layer, so a compromise has to be made. The coverage of the phosphor is preferably in the range from about 300 to 1500 g/m$^2$.

According to a preferred embodiment the phosphor layer is used as a supported layer on a support sheet. Suitable support materials are made of a film forming organic resin, e.g. polyethylene terephthalate, but paper supports and cardboard supports optionally coated with a resin layer such as an alpha-olefinic resin layer are also particularly useful. Glass and metal supports can also be used. The thickness of the phosphor layer is preferably in the range of 0.05 to 0.5 mm.

For the preparation of the photostimulable phosphor screen the phosphor particles are intimately dispersed in a solution of the binder and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per cm$^3$ of dry coating).

Optionally, a light-reflecting layer is provided between the phosphor-containing layer and its support to enhance the output of light emitted by photostimulation. Such a light-reflecting layer may contain white pigment particles dispersed in a binder, e.g. titanium dioxide particles, or it may be made of a vapour-deposited metal layer, e.g. an aluminium layer, or it may be a coloured pigment layer absorbing stimulating radiation but reflecting the emitted light as described e.g. in U.S. Pat. No. 4,380,702.

Optionally a light-absorbing layer is provided between the phosphor-containing layer and its support or in the support itself to avoid reflection of light at the phosphor-containing layer—support interface and thereby increase the resolution of the photostimulable phosphor screen.

In radiography for industry, e.g. applied in non-destructive testing (NDT) of metal objects, where more energetic X-rays and gamma rays are used than in medical X-ray applications it has been found an advantage to combine the fluorescent phosphor layer in an X-ray intensifying screen with a metal layer or metal support the metal of which has an atomic number in the range of 46 to 83 (ref. U.S. Pat. No. 3,872,309). The metal layer or support acts as an emitter of photo-electrons and secondary X-rays of lower energy that are absorbed in an adjacent phosphor layer at a higher efficiency than the strongly energetic X- and gamma-rays emitted by an industrial X-ray apparatus. Applying that kind of screen structure in industrial stimulation radiography more energy is accumulated in the storage phosphor layer and consequently more energy can be freed lateron by photostimulation.

On phosphor screens containing halosilicate phosphors according to the present invention measurements have been carried out to determine their photo-physical properties.

In a first measurement the "prompt" emission spectrum of the phosphor under X-ray excitation is measured. The measurement proceeds with a spectrofluorimeter in which excitation by X-ray irradiation is carried out with an X-ray source operating at 110 kVp. During continuous X-ray excitation the emitted light is scanned by a monochromator coupled to a photomultiplier. This emission spectrum is identical to that obtained upon photostimulation and is used to determine which filter is to be used in separating the fluorescent emission light from the stimulation light. In the hereinafter described measurements a He—Ne laser is used to stimulate the present phosphors. In order to separate the stimulating light of the He—Ne laser from the fluorescent light emitted on stimulation a 5 mm HOYA B390 filter is used whose transmission spectrum is described in HOYA Color Filter Glass Catalogue Nr. 8503 E published by HOYA Corporation, Tokyo, Japan. Since said filter partly absorbs also fluorescent emission light an attenuation coefficient was determined in order to find total emission power.

In a second measurement the total photostimulable energy ($E_0$) stored upon exposure to a given X-ray dose is determined. Prior to X-ray excitation any residual energy still present in the phosphor screen is removed by irradiation. To avoid photoexcitation during erasure a cut-off SCHOTT GG435 filter, which eliminates all wavelengths below 435 nm, is placed between a lamp emitting photostimulating light and the phosphor screen. The phosphor screen is then excited with an X-ray source operating at 85 kVp and 20 mA. For that purpose the MONODOR X-ray source of Siemens AG—W. Germany may be used. The low energy X-rays are filtered out with a 21 mm thick aluminium plate to harden the X-ray spectrum. After X-ray excitation the phosphor screen is transferred in the dark to the measurement set up. In this set up laser light is used to photostimulate the X-ray irradiated phosphor screen. The laser used in such measurements is a He—Ne (633 nm) laser.

The laser-optics comprise an electronic shutter, beam-expander and two filters. A photomultiplier (Hamamatsu R 21398) collects the light emitted by the photostimulation and gives a corresponding electrical current. The measurement procedure is controlled by a Hewlett Packard HP 9826 computer connected to a HP 6944 multiprogrammer. After amplification with a current to voltage convereter a TEKTRONIX 7D20 digital oscilloscope vizualizes the photocurrent obtained. When the electronic shutter is opened the laser beam begins to stimulate the phosphor screen and the digital oscilloscope is triggered. Using a pinhole placed in contact with the phosphor screen an area of only 7 $mm^2$ of the phosphor screen is exposed. Only ¾ of the laser power (22 mW) reaches the screen surface. In this way the intensity of the stimulating beam is more uniform. A red filter (3 mm SCHOTT OG 590) placed immediately in front of the laser eliminates the weak ultraviolet components in the laser emission. The signal amplitude from the photomultiplier is linear with the intensity of the photostimulating light and with the released photostimulable energy. It is assumed that the signal decreases exponentially. When the signal curve is entered the oscilloscope is triggered a second time to measure the offset which is defined as the component of error that is constant and independent of inputs. After subtracting this offset the point at which the signal reaches 1/e of the maximum value is calculated. The integral below the curve is the calculated from the start to this 1/e point. The function is described mathematically by $f(t) = A \cdot e^{-t/\tau}$, wherein A is the amplitude, $\tau$ is the time constant, t is stimulation time, and e is the base of the natural logarithms.

At $t = \tau$, 63% of the stored energy has been released. To obtain said result, the computer multiplies the integral with the sensitivity of the system. The sensitivity of the photomultiplier and amplifier have therefore to be measured as a function of anode-cathode voltage of the photomultiplier and the convolution of the emission spectrum of the phosphor and the transmission spectrum of the separating filter has to be calculated.

Because the emission light is scattered in all directions only a fraction of the emitted light is detected by the photomultiplier. The positions of the panel and photomultiplier are such that 10% of the total emission is detected by the photomultiplier.

After all these corrections have been made a value for the X-ray conversion efficiency is obtained in units of $pJ/mm^2/mR$. To correct for the amount of phosphor exposed this value is divided by the screen thickness, so that an X-ray conversion efficiency in units of $pJ/mm^3/mR$ is obtained. Since said result depends on screen thickness all measurements in order to be comparable have to be carried out at same phosphor coverage.

The photostimulation energy is defined as the energy necessary to stimulate the emission of 63% of the stored energy. The applied photostimulation energy is expressed in $\mu J/mm^2$.

In a third measurement the dark decay characteristics of the phosphor samples are defined. For that purpose the photostimulable energy stored upon exposure to a given X-ray dose was determined 15, 60 or 300 minutes after said exposure. The measuring and analysis procedure as described above for the second measurement is applied.

The stimulable phosphor screens according to the present invention apart from their use in medical and industrial radiography are likewise useful in autoradiography.

In classical autoradiography a photographic record of radioactive material within an object is made by putting the object in contact with a photographic material forming therein directly or through development a record of the radioactive pattern. In autoradiography according to the present invention the radioactive object is placed in contact or close proximity with a stimulable phosphor screen according to the present invention whereby the phosphor stores energy of the radioactive pattern in the object. The stored energy is freed in the form of fluorescent light by photostimulation and the emitted light is detected and used for image storage and reproduction e.g. on photographic material or cathode ray tube.

The present invention is illustrated by the following examples without limiting it thereto.

The ratios, parts and percentages are by weight unless mentioned otherwise.

EXAMPLES 1 and 2 and COMPARATIVE EXAMPLE 3

Preparation of $Ba_{4.985-z}Eu_{0.015}SiO_4Br_6:Li_{2z}$ ($z = 5 \times 10^{-3}$ or $1.5 \times 10^{-2}$) (z represents zero in the comparative example 3)

The following ingredients were weighed out:

| | |
|---|---|
| $BaBr_2 \cdot 2 H_2O$ | 541.7 g |
| $BaCO_3 \cdot 0.47\% H_2O$ | 187 g |
| $Eu_2O_3 \cdot 3.33\% H_2O$ | 1.32 g |
| $SiO_2 \cdot 1.89\% H_2O$ | 30.6 g |

Said ingredients were intimately mixed and ground. Subsequently the mix was divided over two 500 ml containers. To each container four 1.5 cm balls and 180 ml of anhydrous ethanol were added and the mixtures were ground for 15 min in a planetary ball mill. After grinding the raw mixtures were placed in an oven and dried at 70° to 80° C. overnight.

50 g of the raw mix was subjected to a first firing. The firing was carried out at 800° C. in a $N_2$-flow of 1 l per min. After 90 min the powder was removed from the furnace, ground, and fired again for 90 min under the same conditions.

For preparing the Example 1 material $1.46 \times 10^{-3}$ g of LiOH was intimately mixed with 15 g of the first fired material and the mixture was fired again in reducing atmosphere.

For preparing the Example 2 material $4.38 \times 10^{-3}$ g of LiOH was intimately mixed with 15 g of the first fired material and the mixture was fired again in reducing atmosphere.

For preparing the Comparative Example 3 material 15 g of the first fired material was subjected to a firing in a reducing atmosphere in the absence of any LiOH.

The reducing atmosphere applied in the firings, which were carried out at 800° C., consisted of a mixture of a 5/95 vol. % mixture of $H_2$ and $N_2$.

Each powder sample was fired twice for 2 hours and twice for 90 min. Inbetween two firings the powders were ground in a mortar.

Figure 1:
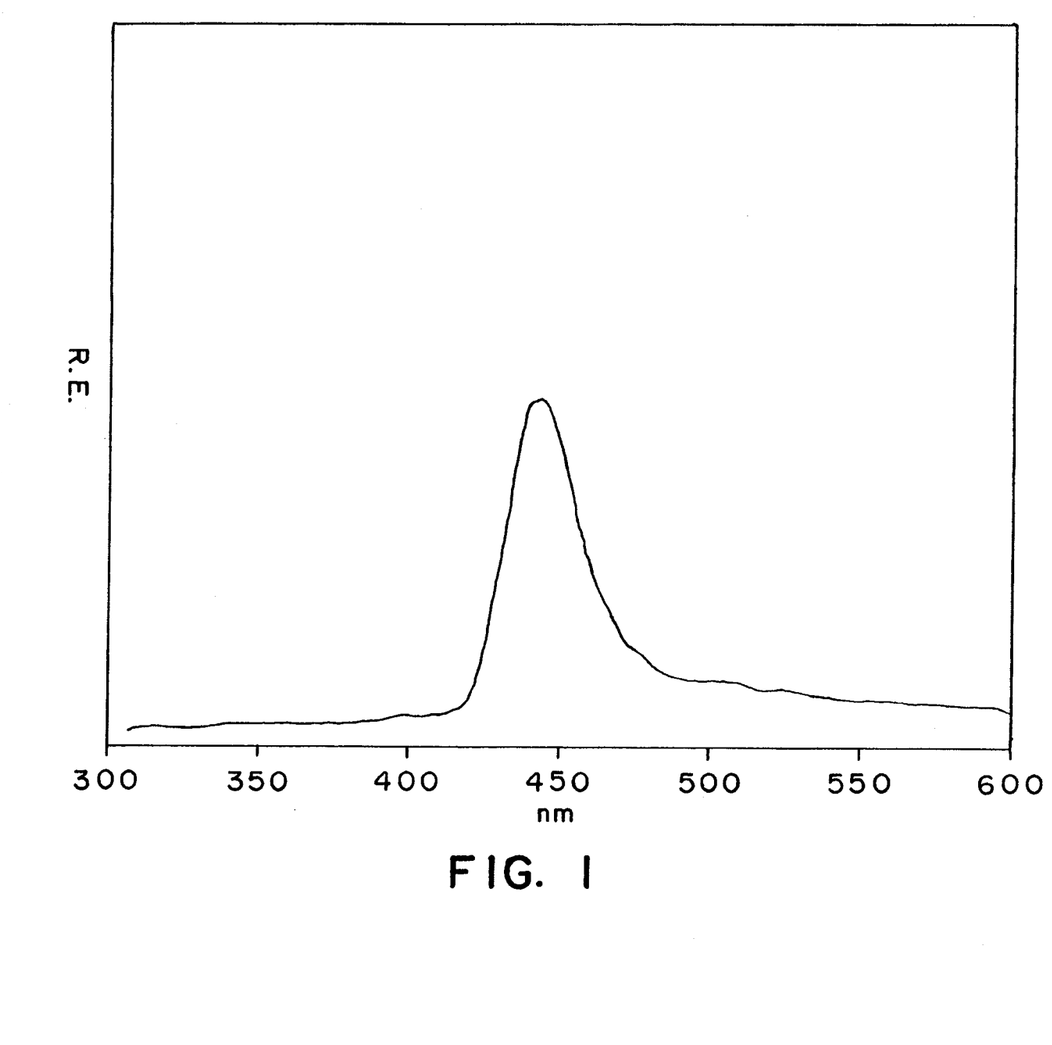
FIG. 1 shows the relative light emission intensity (R.E.) plotted against wavelength in nm.

The 3 obtained samples had similar "prompt" emission spectra. The "prompt" emission spectrum is identical with the spectrum of the fluorescent light emitted on photostimulation and is represented in FIG. 1, wherein the relative light-emission intensity R.E. is plotted against wavelength in nm.

Each phosphor sample was then dispersed in a binder solution containing polyethyl acrylate dissolved in ethyl acetate. Each obtained dispersion was coated onto a 100μ thick transparent sheet of polyethylene terephthalate to give a coating weight of 500 g/m2. The screens were then used to determine the energy storage characteristics of their phosphor. After erasing any residual stored energy by exposure to He—Ne laser light (633 nm), each screen was irradiated with a given dose of X-rays and then stimulated with He—Ne laser. The conversion efficiency was measured as a function of the lapse of time between the X-ray irradiation and the readout of the phosphor screens.

Figure 2:
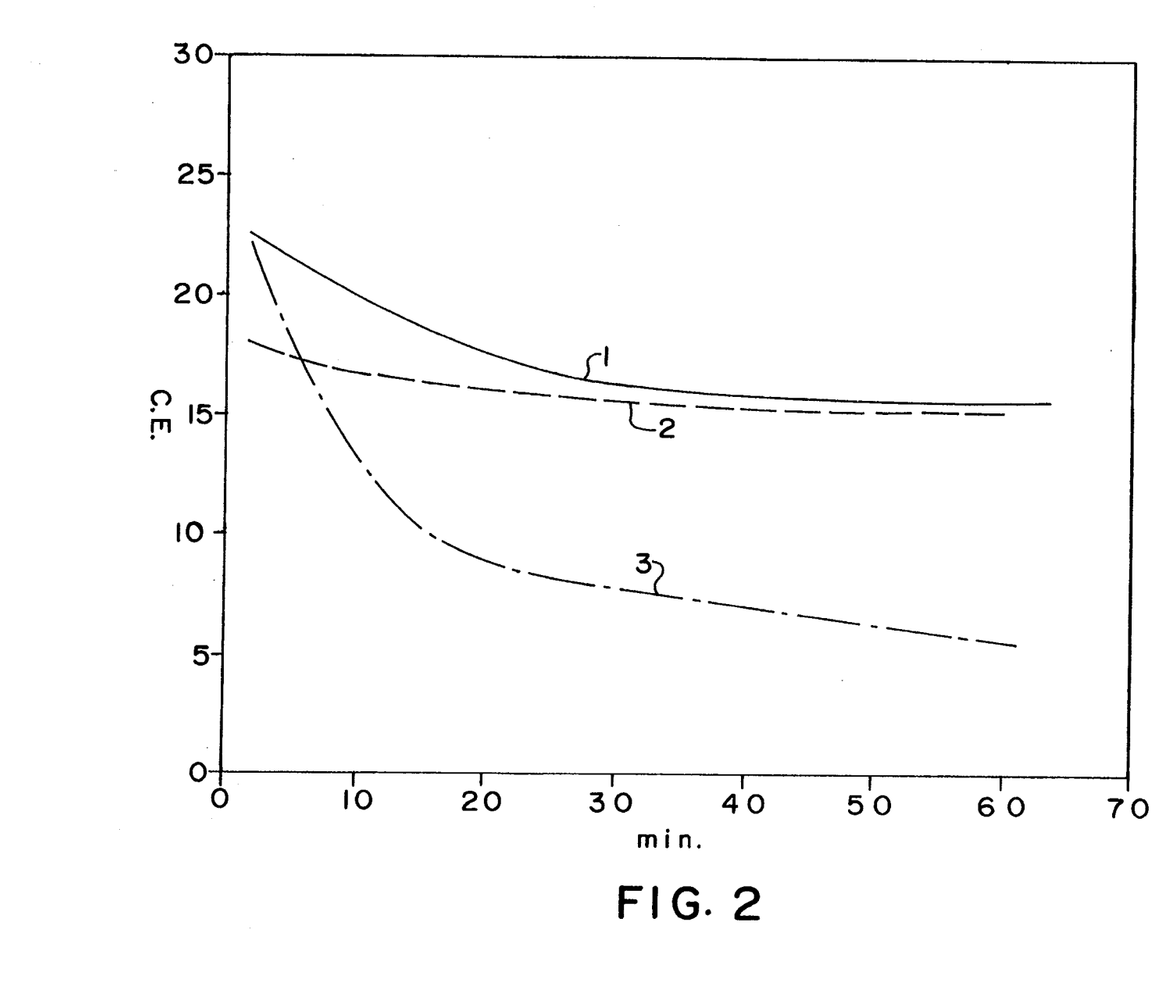
FIGS. 2-4 show the conversion efficiency (C.E.) as a function of time in minutes for various embodiments of the present invention and comparative examples.

In FIG. 2 the conversion efficiency (C.E.) expressed in $pJ/mm^3/mR$ is plotted as a function of the period of time in minutes between the X-ray irradiation and the read-out of the screens of Examples 1, 2 and Comparative Example 3, corresponding respectively with curves 1, 2 and 3.

It is clear from this FIG. 2 that the dark decay behaviour of phosphors according to the present invention as exemplified in Examples 1 and 2 containing Li as dopant is much better than that of such phosphor containing no lithium as exemplified in Comparative Example 3.

EXAMPLES 4 and 5 and COMPARATIVE EXAMPLE 6

In preparing the Example 4 phosphor $4.51 \times 10^{-3}$ g of $LiCO_3$ were intimately mixed with 15 g of the raw mix that according to Example 1 had been subjected to a first firing. The thus obtained mixture was fired again in reducing atmosphere.

In preparing the Example 5 phosphor $1.35 \times 10^{-2}$ g of $LiCO_3$ were intimately mixed with 15 g of the raw mix that according to Example 1 had been subjected to a first firing. The thus obtained mixture was fired again in reducing atmosphere.

In preparing the phosphor of Comparative Example 6 15 g of said first fired raw mix was subjected to a reducing firing in the absence of $LiCO_3$.

The reducing firings of the phosphor samples were carried out at 800° C. in an atmosphere consisting of a 5/95 vol. % mixture of $H_2$ and $N_2$.

The phosphor samples were fired four times for 2 hours and inbetween a series of two firings the powders were ground in a mortar.

Screens were made as described for the Examples 1, 2 and Comparative Example 3.

Figure 3:
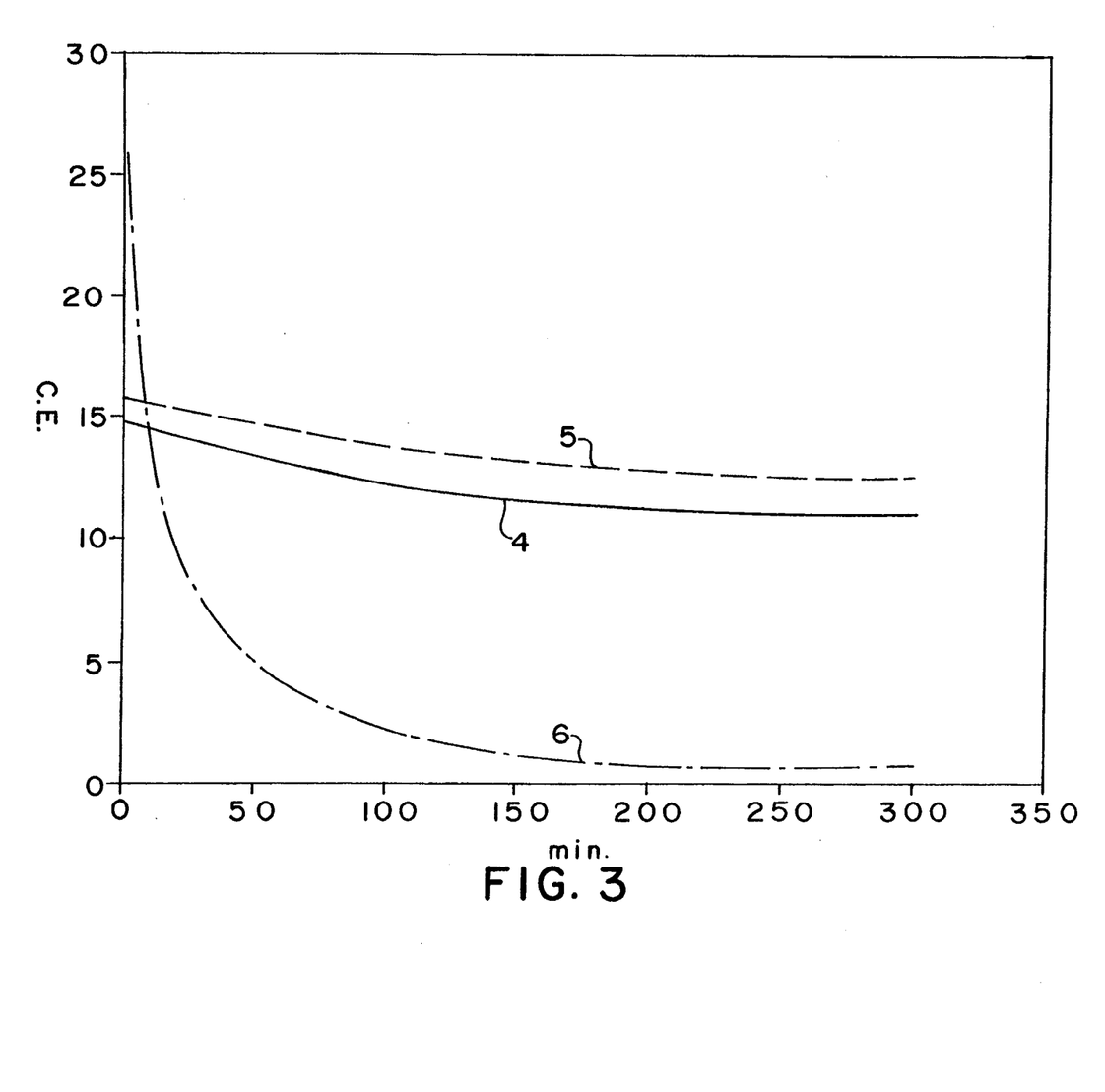

In FIG. 3 the conversion efficiency (C.E.) expressed in $pJ/mm^3/mR$ is plotted as a function of the lapse of time in minutes between X-ray irradiation and the read-out of the screens of Examples 4, 5 and Comparative Example 6, corresponding respectively with curves 4, 5 and 6.

It is clear from FIG. 3 that the dark decay behaviour of phosphors according to the present invention as exemplified in Examples 4 and 5 containing Li as dopant is much better than that of such phosphor containing no lithium as exemplified in Comparative Example 3.

EXAMPLES 7, 8, 9 and 10 and COMPARATIVE EXAMPLE 11

Preparation of $Ba_{4.985-z}Eu_{0.015}SiO_4Br_6:Li_{2z}$ ($z = 1.5 \times 10^{-2}$) (z represents zero in the comparative example 3).

The following ingredients were weighed out:

| | |
|---|---|
| $BaBr_2.2\ H_2O$ | 541.7 g |
| $BaCO_3.\ 0.47\%\ H_2O$ | 187 g |
| $Eu_2O_3.\ 3.33\%\ H_2O$ | 1.32 g |
| $SiO_2.\ 1.89\%\ H_2O$ | 30.6 g |

Said ingredients were intimately mixed and ground. Subsequently the mix was divided over two 500 ml containers. To each container four 1.5 cm balls and 180 ml of anhydrous ethanol were added and the mixtures were ground for 15 min in a planetary ball mill. After grinding the raw mixtures were placed in an oven and dried at 70° to 80° C. overnight.

50 g of the raw mix was subjected to a first firing. The firing was carried out at 800° C. in a $N_2$-flow of 1 l per min. After 90 min the powder was removed from the furnace, ground, and fired again for 90 min under the same conditions.

For preparing the Example 7 and 8 materials respectively $4.67 \times 10^{-3}$ g of LiF and $7.36 \times 10^{-3}$ g of LiCl was intimately mixed with 15 g of the first fired material and the mixtures were fired again in reducing atmosphere.

For preparing the Example 9 and 10 materials $1.56 \times 10^{-2}$ g of LiBr and $2.41 \times 10^{-2}$ g of LiI was intimately mixed with 15 g of the first fired material and the mixtures were fired again in reducing atmosphere.

For preparing the Comparative Example 11 material 15 g of the first fired material was subjected to a firing in a reducing atmosphere in the absence of any Li-compound.

The reducing atmosphere applied in the firings, which were carried out at 800° C., consisted of a mixture of a 5/95 vol. % mixture of $H_2$ and $N_2$.

Each powder sample was fired four times for 2 hours. Inbetween two firings the powders were ground in a mortar.

The 5 obtained samples had similar "prompt" emission spectra. The "prompt" emission spectrum is identical with the spectrum of the fluorescent light emitted on photostimulation and is represented in FIG. 1, wherein the relative light-emission intensity R.E. is plotted against wavelength in nm.

Each phosphor sample was then dispersed in a binder solution containing polyethyl acrylate dissolved in ethyl acetate. Each obtained dispersion was coated onto a 100μ thick transparent sheet of polyethylene terephthalate to give a coating weight of 500 g/m2. The screens were then used to determine the energy storage characteristics of their phosphor. After erasing any residual stored energy by exposure to He—Ne laser light (633 nm), each screen was irradiated with a given dose of X-rays and then stimulated with He—Ne laser. The conversion efficiency was measured as a function of the lapse of time between the X-ray irradiation and the readout of the phosphor screens.

Figure 4:
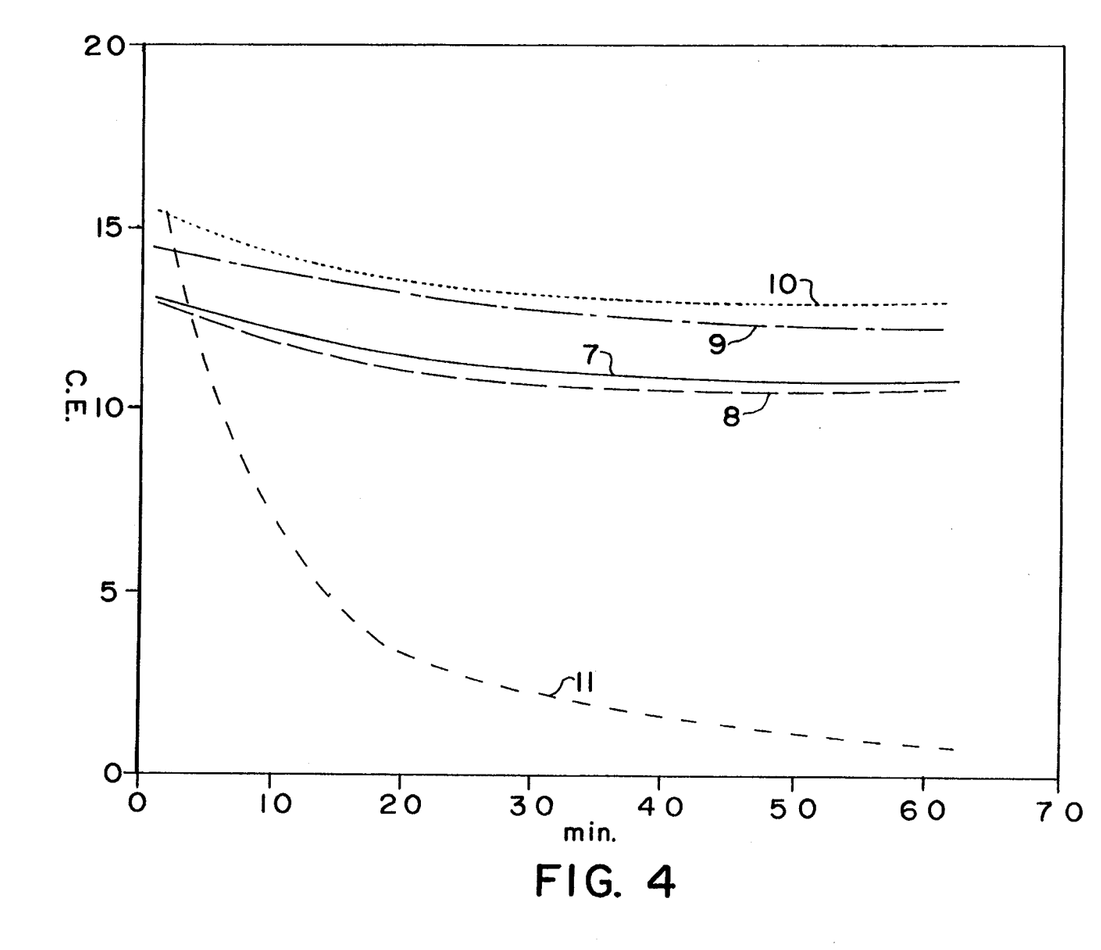

In FIG. 4 the conversion efficiency (C.E.) expressed in pJ/mm³/mR is plotted as a function of the period of time in minutes between the X-ray irradiation and the read-out of the screens of Examples 7 to 10 and Comparative Example 11, corresponding respectively with curves 7, 8, 9, 10 and 11.

It is clear from this FIG. 4 that the dark decay behaviour of phosphors according to the present invention as exemplified in Examples 7 to 10 containing Li as dopant is much better than that of such phosphor containing no lithium as exemplified in Comparative Example 11.

We claim:

1. A photostimulable X-ray energy absorbing halosilicate phosphor, characterized in that said phosphor contains as host metal at least one alkaline earth metal, as halogen at least one member selected from the group consisting of Cl, Br and I, as dopant $Eu^{2+}$ and as co-dopant lithium.

2. A phosphor according to claim 1, wherein said phosphor contains as host metal at least one alkaline earth metal selected from the group consisting of Ba, Sr and Ca.

3. A phosphor according to claim 1, wherein said phosphor is within the scope of of the following empirical formula:

$$Ba_{5-(n+p+q+z)}Z_q SiO_4 X_6 : Eu^{2+}{}_n, D^{m+}{}_{2p/m}, Li_{2z}$$

wherein:
- Z is at least one co-host metal selected from the group consisting of strontium and calcium,
- q is in the range of 0 to 0.5,
- X is bromine and/or chlorine,
- n is in the range of 0.0001 to 0.15,
- p is in the range of 0 to 0.015,
- D is at least one co-dopant selected from the group consisting of $Na^+$, $K^+$ and a rare earth metal ion other than $Eu^{2+}$ and $Ce^{3+}$,
- m is 1 or 3, and
- z is in the range of $2 \times 10^{-5}$ to $2 \times 10^{-2}$.

4. A phosphor according to claim 1, wherein said phosphor is within the scope of of the following empirical formula:

$$Sr_{5-(n+p+q+z)}Z_q SiO_4 X_6 : Eu^{2+}{}_n, D^{m+}{}_{2p/m}, Li_{2z}$$

wherein:
- Z is at least one co-host metal selected from the group consisting of barium and calcium,
- q is in the range of 0 to 0.5,
- X is bromine,
- n is in the range of 0.0001 to 0.15,
- p is in the range of 0 to 0.015,
- D is at least one co-dopant selected from the group consisting of $Na^+$, $K^+$ and a rare earth metal ion other than $Eu^{2+}$ and $Ce^{3+}$,
- m is 1 or 3, and
- z is in the range of $2 \times 10^{-5}$ to $2 \times 10^{-2}$.

5. A phosphor according to claim 1, wherein said phosphor is within the scope of one of the following empirical formulae (I) or (II):

$$Ba_{5-(n+p+z)}SiO_4 X_6 : Eu^{2+}{}_n, D^{m+}{}_{2p/m}, Li_{2z} \qquad (I)$$

$$Sr_{5-(n+p+z)}SiO_4 X_6 : Eu^{2+}{}_n, D^{m+}{}_{2p/m}, Li_{2z} \qquad (II)$$

wherein:
- X is bromine and/or chlorine,
- n is in the range of 0.0001 to 0.15,
- p is in the range of 0 to 0.015,
- D is at least one co-dopant selected from the group consisting of $Na^+$, $K^+$ and a rare earth metal ion other than $Eu^{2+}$ and $Ce^{3+}$,
- m is 1 or 3, and
- z is in the range of $2 \times 10^{-5}$ to $2 \times 10^{-2}$.

6. A phosphor according to claim 1, wherein said phosphor is within the scope of one of the empirical formulae (III) or (IV):

$$Ba_{5-n}SiO_4 X_6, Eu^{2+}{}_n, Li_{2z} \qquad (III)$$

$$Sr_{5-n}SiO_4 Br_6, Eu^{2+}{}_n, Li_{2z} \qquad (IV)$$

wherein:
- n is in the range from 0.0001 to 0.15,
- X is bromine and/or chlorine, and
- z is in the range of $2 \times 10^{-5}$ to $2 \times 10^{-2}$.

* * * * *